(12) United States Patent
Wang et al.

(10) Patent No.: US 11,308,305 B2
(45) Date of Patent: Apr. 19, 2022

(54) FINGERPRINT COLLECTION APPARATUS AND FINGERPRINT COLLECTION METHOD

(71) Applicant: HUAWEI TECHNOLOGIES CO., LTD., Guangdong (CN)

(72) Inventors: Xilin Wang, Dongguan (CN); Tao Wang, Dongguan (CN); Ding Zhong, Dongguan (CN); Xiao Xing, Shanghai (CN); Wei Ma, Hangzhou (CN); Chun Yen Liu, Shenzhen (CN); Sooyoung Woo, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/986,609

(22) Filed: Aug. 6, 2020

(65) Prior Publication Data

US 2020/0364437 A1 Nov. 19, 2020

Related U.S. Application Data

(63) Continuation of application No. PCT/CN2018/075655, filed on Feb. 7, 2018.

(51) Int. Cl.
*G06K 9/00* (2006.01)
(52) U.S. Cl.
CPC ........ *G06K 9/0004* (2013.01); *G06K 9/00114* (2013.01); *G06K 2009/0006* (2013.01)
(58) Field of Classification Search
CPC ............. G06K 9/0004; G06K 9/00114; G06K 2009/0006
See application file for complete search history.

(56) References Cited

U.S. PATENT DOCUMENTS

| 2016/0148034 A1* | 5/2016 | Kremin | G06K 9/00033 |
|---|---|---|---|
| | | | 382/124 |
| 2016/0292488 A1 | 10/2016 | Ran et al. | |
| 2017/0154198 A1 | 6/2017 | Li et al. | |

(Continued)

FOREIGN PATENT DOCUMENTS

| CN | 101079099 A | 11/2007 |
|---|---|---|
| CN | 103745194 A | 4/2014 |

(Continued)

*Primary Examiner* — Stephen G Sherman
(74) *Attorney, Agent, or Firm* — Womble Bond Dickinson (US) LLP

(57) ABSTRACT

This application provides a fingerprint collection apparatus. According to the fingerprint collection method and the related apparatus that are provided in this application, a sensor array is divided into a plurality of areas in terms of a column based on a quantity of input ports of an analog front end component and a quantity of columns of the sensor array, and sensor units in different areas multiplex input channels of the analog front end component by using switches. In this way, when scanning row scanning lines in the sensor array, a row scanning circuit may control the switches to output, to the analog front end component in a time division manner, original fingerprint data collected by the sensor units in the different areas, so that fewer input channels of the analog front end component can be required, and a size of a fingerprint collection apparatus can be reduced.

18 Claims, 6 Drawing Sheets

(56) References Cited

U.S. PATENT DOCUMENTS

2018/0247099 A1* 8/2018 Liu .................. G06K 9/0008
2019/0034024 A1* 1/2019 Park ................ G06F 3/041661

FOREIGN PATENT DOCUMENTS

| CN | 106570442 A | 4/2017 |
| CN | 106815565 A | 6/2017 |
| CN | 107578026 A | 1/2018 |

* cited by examiner

FINGERPRINT COLLECTION APPARATUS AND FINGERPRINT COLLECTION METHOD

CROSS-REFERENCE TO RELATED APPLICATIONS

This application is a continuation of International Application No. PCT/CN2018/075655, filed on Feb. 7, 2018, the disclosure of which is hereby incorporated by reference in its entirety.

TECHNICAL FIELD

This application relates to the fingerprint recognition field, and more specifically, to a fingerprint collection apparatus and a fingerprint collection method.

BACKGROUND

A working principle of implementing in-screen fingerprint recognition in a mobile phone is as follows: When a screen of the mobile phone lights up and a finger touches the screen of the mobile phone, the finger is illuminated. After light reflected by a fingerprint of the finger passes through a light transmission gap between pixels of the screen, the light is projected and imaged on a sensor array beneath the screen under a convergence effect of a microlens or a small hole. Then, the sensor converts an optical signal projected onto the sensor into an electrical signal, and may obtain a fingerprint image based on the electrical signal.

Based on the foregoing principle, how to collect a fingerprint image is a technical problem that is urgently to be resolved.

SUMMARY

This application provides a fingerprint collection method and a related apparatus, so that a size of a fingerprint collection apparatus is reduced while fingerprint image information is collected. This helps to integrate the fingerprint collection apparatus into an electronic device.

According to a first aspect, this application provides a fingerprint collection apparatus. The fingerprint collection apparatus includes a sensor array, a row scanning circuit, a switch component, and an analog front end (AFE) component.

The sensor array includes M rows of sensor units and N columns of sensor units, the analog front end component includes L input channels, M and N are positive integers greater than 1, and L is a positive integer less than N.

The N columns of sensor units are grouped into a plurality of groups of sensor units based on column as a unit, and a quantity of columns of sensor units included in each of the plurality of groups of sensor units is less than or equal to L.

The switch component multiplexes the L input channels of the analog front end component in a time division manner by using data lines of the plurality of groups of sensor units.

The row scanning circuit is configured to output row scanning signals of the sensor array row by row.

The sensor unit in the sensor array is configured to: generate original fingerprint data, and output the original fingerprint data from a data line when the row scanning signal is received.

The switch component is configured to select to output original fingerprint data in any one of the plurality of groups of sensor units to the L input channels of the analog front end component.

The analog front end component is configured to convert, into digital fingerprint data, the original fingerprint data that is output by the any group of sensor units.

In other words, the sensor unit in the sensor array is configured to generate and store original fingerprint image data (an analog electrical signal). The row scanning circuit is responsible for scanning a row scanning line in the sensor array (in other words, the row scanning circuit is equivalent to a shift register, and performs row-by-row scanning on the sensor array under the control of a clock signal). The switch component is a multi-channel signal multiplexing component. The row scanning circuit cooperates with the switch component to select sensor units in some columns in the sensor array to output fingerprint image data, in other words, to output fingerprint image data of a finger. The analog front end component is configured to convert, into a digital signal, the analog electrical signal generated and stored by the sensor array, to obtain digital fingerprint image data.

The row scanning circuit and the switch component may be located at an edge location of the fingerprint collection apparatus, for example, may be located in a non-display area of the fingerprint collection apparatus.

The row scanning circuit may include a gate on array (GOA). The sensor array may include a thin film transistor (TFT) substrate and an organic photodiode diode (OPD) disposed on the TFT substrate. The switch component may be a TFT.

Because the switch component is the multi-channel signal multiplexing component, data lines of a plurality of columns of sensor units can be used to multiplex a same input channel of the analog front end component, so that a quantity of input channels of the analog front end component can be reduced, and a size of the fingerprint collection apparatus can be reduced.

In one embodiment, the switch component includes a plurality of groups of switches, the plurality of groups of switches are in a one-to-one correspondence with the plurality of groups of sensor units, and data lines of each of the plurality of groups of sensor units are connected to the L input channels of the analog front end component by using a corresponding group of switches in the plurality of groups of switches.

The fingerprint collection apparatus further includes a first control component, and the first control component is configured to send a clock signal to the row scanning circuit.

The row scanning circuit is specifically configured to output the row scanning signals of the sensor array row by row based on the clock signal.

The first control component is further configured to send enabling signals to the plurality of groups of switches, and the enabling signal are used to turn on a target group of switches in the plurality of groups of switches and turn off the other groups of switches in the plurality of groups of switches.

The switch component is configured to select to output original fingerprint data in a target group of sensor units corresponding to the target group of switches to the L input channels.

For example, each of the plurality of groups of switches includes L switches, each of the plurality of groups of sensor units includes L columns of sensor units, and data lines of the L columns of sensor units in each group of sensor units are respectively connected to the L input channels of the analog front end component by using L switches in a corresponding group of switches.

In one embodiment, in the enabling signals sent by the first control component to the plurality of groups of switches, enabling signals of one group of switches may be the same.

For example, the sensor array may be divided into a plurality of areas in terms of a column. When each area includes a plurality of columns of sensor units, sensor units in different columns in each area are respectively connected to different input channels of the analog front end component by using switches. However, sensor units in columns in different areas are connected to a same input channel of the analog front end component by using a switch. In other words, by controlling one of a plurality of switches connected to a same input channel of the analog front end component to be turned on, and controlling the other switches to be turned off, signal transmission between a sensor unit connected to a switch that is turned on and the input channel of the analog front end component can be implemented. Switches in a same area may be turned on or turned off by using a same signal.

For example, when the sensor array includes 2048 rows of sensor units and 1024 columns of sensor units, and the analog front end component includes only 256 input channels, the 1024 columns of sensor units may be classified into four areas. Starting from the first column, every 256 columns constitute one area. 256 columns of sensor units in each area constitute one group of sensor units, and there are four groups of sensor units in total. The switch component includes four groups of switches, and each group of switches includes 256 switches. The four groups of switches are in a one-to-one correspondence with the four groups of sensor units.

Data lines of the 256 columns of sensor units in each group of sensor units are respectively connected to the 256 input channels of the analog front end component by using the corresponding 256 switches. In this way, the 1024 columns of sensor units in the four areas multiplex the 256 input channels of the analog front end component. Every four columns of sensor units multiplex one input channel of the analog front end component.

In one embodiment, the row scanning circuit includes M output channels. The switch component includes a plurality of groups of switches, and the plurality of groups of switches are in a one-to-one correspondence with the plurality of groups of sensor units. Each group of switches includes M switches. Scanning lines of each group of sensor units are connected to the M output channels of the row scanning circuit by using a corresponding group of switches in the plurality of groups of switches. Data lines of each group of sensor units are connected to the L input channels of the analog front end component.

The fingerprint collection apparatus further includes a first control component, and the first control component is configured to send a clock signal to the row scanning circuit.

The row scanning circuit is specifically configured to output the row scanning signals of the sensor array row by row based on the clock signal.

The first control component is further configured to send enabling signals to the plurality of groups of switches, and the enabling signal are used to turn on a target group of switches in the plurality of groups of switches and turn off the other groups of switches in the plurality of groups of switches.

The switch component is configured to select to output original fingerprint data in a target group of sensors corresponding to the target group of switches to the L input channels.

For example, the sensor array may be divided into a plurality of areas in terms of a column. When each area includes a plurality of columns of sensor units, data lines of sensor units in different columns in each area are connected to different input channels of the analog front end component. However, data lines of sensor units in columns in different areas are connected to a same input channel of the analog front end component. Sensor units that are in each row of sensor units and that are located in a same area are connected to one output channel of the row scanning circuit by using one switch.

For example, when the sensor array includes 2048 rows of sensor units and 1024 columns of sensor units, and the analog front end component includes only 256 input channels, the 1024 columns of sensor units may be classified into four areas. Starting from the first column, every 256 columns constitute one area. The row scanning circuit includes 2048 output channels. 256 columns of sensor units in each area constitute one group of sensor units, and there are four groups of sensor units in total.

The switch component includes four groups of switches, each group of switches includes 2048 switches, and the 2048 switches in each group of switches are respectively connected to the 2048 output channels of the row scanning circuit. The four groups of switches are in a one-to-one correspondence with the four groups of sensor units.

Data lines of the 256 columns of sensor units in each group of sensor units are respectively connected to the 256 input channels of the analog front end component. In this way, the 1024 columns of sensor units in the four areas multiplex the 256 input channels of the analog front end component. Every four columns of sensor units multiplex one input channel of the analog front end component.

In the foregoing examples, if a finger falls within an area of the four areas, a group of switches connected to sensor units in the area may be turned on, and switches connected to sensor units in the other areas may be turned off, so that only the sensor units in the area can output original fingerprint data to the input channels of the analog front end component. If a finger falls within another area, a group of switches connected to sensor units in the another area may be turned on, and switches connected to sensor units in the other areas may be turned off, so that only the sensor units in the another area can output original fingerprint data to the input channels of the analog front end component. Switches in a same area may be turned on or turned off by using a same enabling signal.

Certainly, the finger may cross a plurality of areas, for example, may fall within two areas. In this case, turn-on and turn-off control may be performed on switches corresponding to sensor units in the plurality of areas for a plurality of times, so that original fingerprint data generated by the sensor units in the plurality of areas can be obtained.

In one embodiment, the first control component is further configured to output a collection time sequence signal to the analog front end component when outputting the clock signal and the enabling signal to the row scanning circuit. The collection time sequence signal is used to control the analog front end component to receive the original fingerprint data that is output by the sensor array.

The first control component may be a dedicated chip of the fingerprint collection apparatus, for example, may be a field programmable gate array (FPGA) or an application-specific integrated circuit (ASIC).

Switches connected to sensor units in a same area may be turned on or turned off by using a same enabling signal.

In one embodiment, the fingerprint collection apparatus further includes a screen and a second control component.

The second control component is configured to: determine location information of a finger on the screen, and send the location information of the finger to the first control component.

The first control component is configured to: determine a start row and an end row of the M rows of sensor units based on the location information of the finger, determine the target group of sensor units from the plurality of groups of sensor units based on the location information of the finger, output the collection time sequence signal to the analog front end component when the row scanning circuit outputs the row scanning signal to the start row, and stop outputting the collection time sequence signal to the analog front end component until the row scanning circuit outputs the row scanning signal to the end row. The target group of switches correspond to the target group of sensor units, sensor units between the start row and the end row include a sensor unit that is in the sensor array and that is located in an area corresponding to the location information of the finger, and the target group of sensor units includes the sensor unit.

In one embodiment, the screen may be an optical liquid crystal display (LCD).

In one embodiment, the start row may be the first row in the M rows.

In one embodiment, the first control component may be integrated into the second control component, or the first control component is the second control component.

In one embodiment, the second control component may be an application processor in an electronic device to which the fingerprint collection apparatus is applied.

In one embodiment, the area corresponding to the location information of the finger includes an area, of a size of 10 millimeters×10 millimeters, that is centered on a location indicated by the location information.

In one embodiment, each switch includes one thin film transistor.

In one embodiment, each sensor unit in the sensor array includes one thin film transistor and one organic photosensitive diode, the organic photosensitive diode is configured to generate and store original fingerprint data, and the thin film transistor is configured to: when the row scanning signal is received, output the original fingerprint data generated by the organic photosensitive diode.

According to a second aspect, this application provides a fingerprint collection method. The fingerprint collection method is performed by the fingerprint collection apparatus in the first aspect.

In one embodiment, the fingerprint collection method includes:

outputting, by the row scanning circuit, row scanning signals of the sensor array row by row;

generating, by the sensor unit in the sensor array, original fingerprint data, and outputting the original fingerprint data from a data line when the row scanning signal is received;

selecting, by the switch component, to output original fingerprint data in any one of the plurality of groups of sensor units to the L input channels of the analog front end component; and converting, by the analog front end component into digital fingerprint data, the original fingerprint data that is output by the any group of sensor units.

In one embodiment, the fingerprint collection method further includes:

sending, by the first control component, a clock signal to the row scanning circuit;

sending, by the first control component, enabling signals to the plurality of groups of switches, where the enabling signal are used to turn on a target group of switches in the plurality of groups of switches and turn off the other groups of switches in the plurality of groups of switches;

the outputting, by the row scanning circuit, row scanning signals of the sensor array row by row includes: outputting, by the row scanning circuit, the row scanning signals of the sensor array row by row based on the clock signal; and the selecting, by the switch component, to output original fingerprint data in any one of the plurality of groups of sensor units to the L input channels of the analog front end component includes: selecting, by the switch component based on the enabling signal, to output original fingerprint data in a target group of sensor units corresponding to the target group of switches to the L input channels.

In one embodiment, the fingerprint collection apparatus further includes:

outputting, by the first control component, a collection time sequence signal to the analog front end component when outputting the clock signal and the enabling signal, where the collection time sequence signal is used to control the analog front end component to receive the original fingerprint data that is output by the sensor array; and the converting, by the analog front end component into digital fingerprint data, the original fingerprint data that is output by the any group of sensor units includes:

when receiving the collection time sequence signal, converting, by the analog front end component into the digital fingerprint data, the original fingerprint data that is output by the any group of sensor units.

In one embodiment, the fingerprint collection method further includes: determining, by the second control component, location information of a finger on the screen, and sending the location information to the first control component; and the outputting, by the first control component, the clock signal to the row scanning circuit, outputting the enabling signal to the switch component, and outputting a collection time sequence signal to the analog front end component includes:

determining, by the first control component, a start row and an end row of the M rows of sensor units based on the location information;

determining the target group of sensor units from the plurality of groups of sensor units based on the location information;

outputting the collection time sequence signal to the analog front end component when the row scanning circuit outputs the row scanning signal to the start row, and stopping outputting the collection time sequence signal to the analog front end component until the row scanning circuit outputs the row scanning signal to the end row;

determining, as the target group of switches, a group of switches, in the plurality of groups of switches, that correspond to the target group of sensor units; and sending an enabling signal for turning on the target group of switches to the target group of switches, and sending an enabling signal for turning off the other groups of switches in the plurality of groups of switches to the other groups of switches, where sensor units between the start row and the end row include a sensor unit that is in the sensor array and that is located in an area corresponding to the location information, and the target group of sensor units includes the sensor unit.

In one embodiment, the fingerprint collection apparatus includes: sending, by the second control component, the location information to the screen; and illuminating, by the screen based on the location information, a pixel that is on the screen and that is located in the area corresponding to the location information.

In one embodiment, the area corresponding to the location information includes an area, of a size of 10 millimeters×10 millimeters, that is centered on a location indicated by the location information.

In one embodiment, each switch includes one thin film transistor.

In one embodiment, each sensor unit includes one thin film transistor and one organic photosensitive diode, the organic photosensitive diode is configured to generate original fingerprint data, and the thin film transistor is configured to: when the row scanning signal is received, output the original fingerprint data generated by the organic photosensitive diode.

The foregoing fingerprint collection apparatus and the foregoing fingerprint collection method may be applied to a full-screen terminal device.

According to a third aspect, this application provides a computer-readable storage medium. The computer-readable storage medium stores program code executed by a fingerprint collection apparatus, and the program code includes an instruction used to perform the fingerprint collection method in the second aspect.

According to a fourth aspect, this application provides a computer program product including an instruction. When the computer program product is run on a fingerprint collection apparatus, the fingerprint collection apparatus is enabled to perform the fingerprint collection method in the second aspect.

According to a fifth aspect, this application provides a system chip. The system chip includes an input/output interface and at least one processor. The at least one processor is configured to execute an instruction and invoke the input/output interface, to perform operations of the fingerprint collection method in the second aspect.

According to a sixth aspect, this application provides a display, including the fingerprint collection apparatus provided in the first aspect and the implementations of the first aspect, and a display component. The display component is located above the fingerprint collection apparatus, and the display component is a component (for example, various display components based on an OLED, a TFT, an LCD, and an LED) configured to display an image.

According to a seventh aspect, this application provides a terminal, including the fingerprint collection apparatus provided in the first aspect and the implementations of the first aspect, and various components required by the terminal such as a processor (for example, a HiSilicon Kirin-series processor or a Qualcomm Snapdragon-series processor), a memory, a housing, or a battery. The processor may be configured to receive and process data of the fingerprint collection apparatus.

DESCRIPTION OF EMBODIMENTS

The following describes technical solutions of this application with reference to accompanying drawings.

Figure 1:
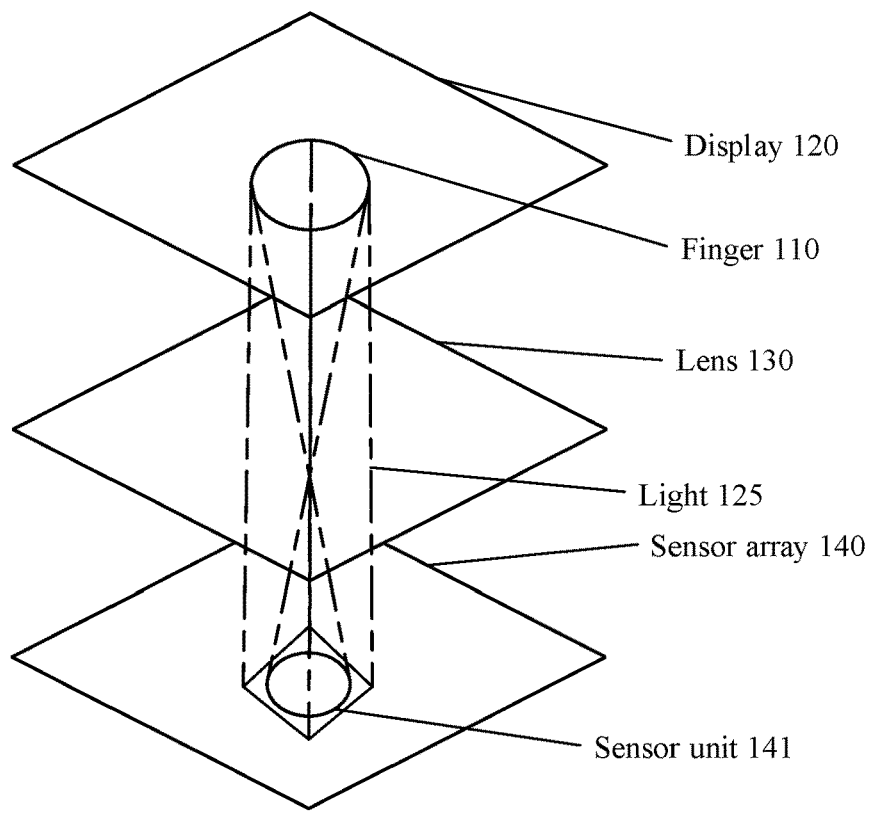
FIG. 1 is a schematic diagram of a principle of a fingerprint recognition method according to this application.

As shown in FIG. 1, a procedure of in-screen fingerprint recognition is as follows: Light emitted by a display 120 is irradiated to a finger 110. A fingerprint of the finger 110 reflects the light. The light 125 reflected by the fingerprint of the finger 110 passes through a light transmission gap on the display 120, and is projected onto a sensor array 140 under the action of convergence of a lens 130. A sensor unit 141 of the sensor array 140 converts an optical signal projected onto the sensor unit 141 into an electrical signal. The electrical signal is original data of the fingerprint, which may also be referred to as original fingerprint data.

Because the electrical signal obtained by the sensor unit 141 through conversion is analog, the analog electrical signal further needs to be converted into a digital signal, to collect image information of the fingerprint.

If a display area of the display 120 is relatively large, for example, when the display 120 is a full screen, to implement fingerprint collection on the full screen, the sensor array 140 needs to generate a relatively large amount of original fingerprint data, and therefore a relatively large quantity of analog-to-digital conversion components are required to perform analog-to-digital conversion on the original fingerprint data. However, a size of a current analog-to-digital conversion component is relatively large, and therefore a relatively large quantity of analog-to-digital conversion components increase a size of a fingerprint collection apparatus.

Therefore, this application provides a fingerprint collection apparatus and a fingerprint collection method. Data lines through which a plurality of sensor units output original fingerprint data are used to multiplex a same input channel of an analog-to-digital conversion component, in other words, the original fingerprint data that is output by the plurality of sensor units is used to multiplex a same analog-to-digital conversion component, so that a quantity of analog-to-digital conversion components can be reduced, and a size of the fingerprint collection apparatus can be reduced.

Figure 2:
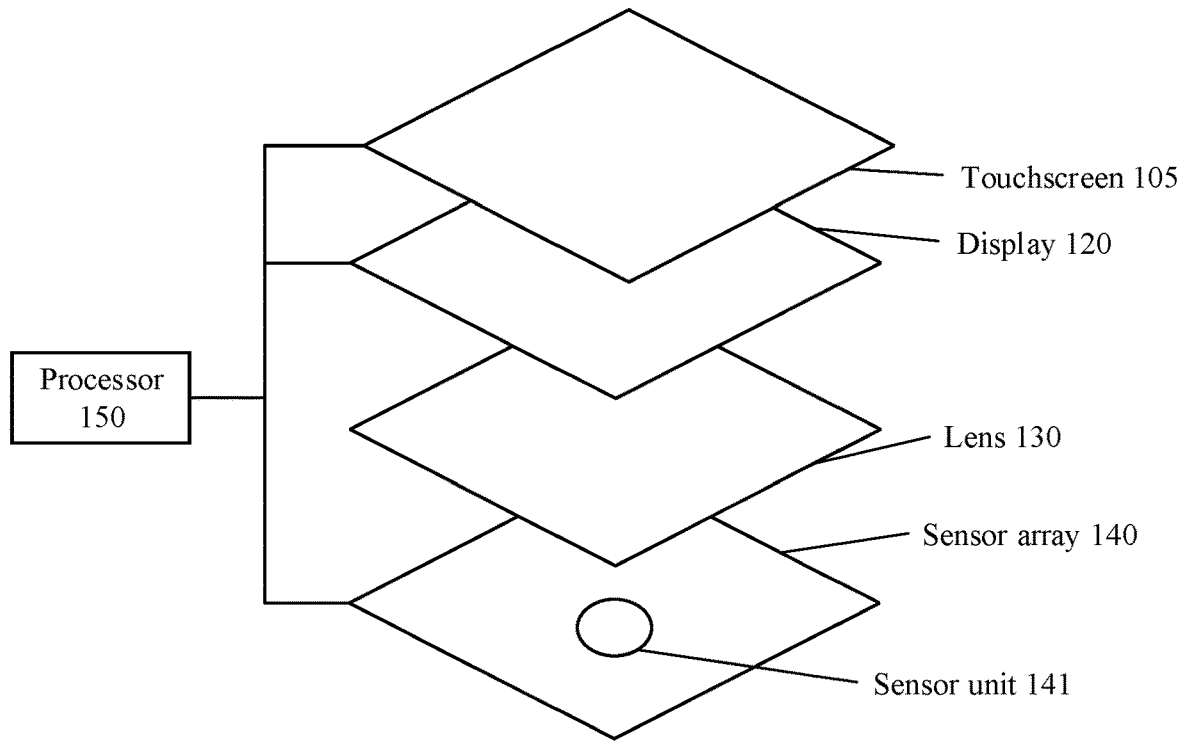
FIG. 2 is a schematic diagram of an application scenario of a fingerprint recognition method according to an embodiment of this application.

FIG. 2 is a schematic diagram of an application scenario of a fingerprint collection apparatus and a fingerprint collection method according to this application. Same reference numerals and identifiers in FIG. 2 and FIG. 1 have same or similar meanings, and details are not described herein again. The following describes only content in FIG. 2 that is different from that in FIG. 1.

A touchscreen 105 is located above the display 120. Certainly, this is merely an example. The touchscreen 105 may alternatively be located below the display 120. The touchscreen 105 and the display 120 may be referred to as a screen.

The touchscreen 105 is configured to: detect touch information of a user finger on the screen, and transmit the touch information to a processor 150.

The processor 150 may determine location information of the user finger on the screen based on the touch information detected by the touchscreen 105.

In addition, after original fingerprint data generated by the sensor array 140 is converted into digital fingerprint data, the digital fingerprint data may be sent to the processor 150. The processor 150 records the digital fingerprint data or matches the digital fingerprint data against digital fingerprint data prestored in the processor 150. If the digital fingerprint data matches the digital fingerprint data prestored in the processor 150, a corresponding operation such as screen unlocking or payment may be performed.

Figure 3:
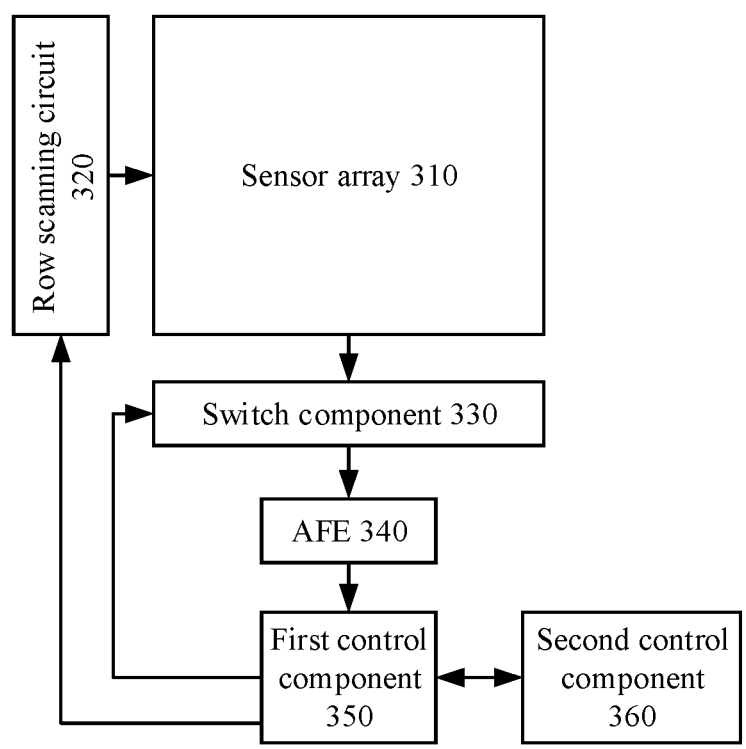
FIG. 3 is a schematic structural diagram of a fingerprint collection apparatus according to an embodiment of this application.

A schematic structural diagram of a fingerprint collection apparatus according to an embodiment of this application is shown in FIG. 3. The fingerprint collection apparatus may include a sensor array 310, a row scanning circuit 320, a switch component 330, an analog front end component 340, a first control component 350, and a second control component 360.

The sensor array 310 may include a TFT substrate and an OPD disposed on the TFT substrate. For example, the TFT substrate includes M rows of TFTs and N columns of TFTs, M rows of OPDs and N columns of OPDs are disposed on the TFT substrate, and the M rows of OPDs and the N columns of OPDs are respectively connected to the M rows of TFTs and the N columns of TFTs. Each TFT is configured to enable an OPD connected to the TFT, and each OPD is configured to convert a sensed optical signal into an electrical signal.

The row scanning circuit 320 and the switch component 330 may be located at an edge location of the TFT substrate. For example, the row scanning circuit 320 and the switch component 330 may be located in a non-display area of the TFT substrate.

The row scanning circuit 320 is equivalent to a shift register, and is responsible for scanning sensors in the sensor array 310 row by row under the control of a clock signal.

The switch component 330 is a multi-channel multiplexing component, and may be implemented by a TFT.

The row scanning circuit 320 may cooperate with the switch component 330 to select sensors in some areas in the sensor array 310 to output original fingerprint data, in other words, to output a fingerprint image signal of a finger on a screen.

For example, when the sensor array 310 is divided into four areas: A1, A2, A3, and A4, the row scanning circuit 320 and the switch component 330 may be configured to select sensors in one of the four areas to output original fingerprint data.

An input channel of the analog front end component 340 is connected to an output channel of the switch component 330, and an output channel of the analog front end component 340 is connected to the first control component 350. The analog front end component 340 is configured to: convert the received original fingerprint data into digital fingerprint data, and output the digital fingerprint data to the first control component 350.

The first control component 350 is responsible for controlling the row scanning circuit 320 and the switch component 330 to select sensor units in the sensor array, controlling the analog front end component 340 to convert the original fingerprint data, and outputting, to the second control component 360, the digital fingerprint data received from the analog front end component 340. The first control component may be an FPGA, an ASIC, or the like.

The second control component may extract a fingerprint feature of the digital fingerprint data, and store the extracted fingerprint feature or compare the extracted fingerprint feature with a prestored fingerprint feature. If the extracted fingerprint feature matches the prestored fingerprint feature, an operation such as unlocking or payment may be performed.

The first control component may be integrated into the second control component, or a function of the first control component may be implemented by the second control component.

It should be understood that the fingerprint collection apparatus shown in FIG. 3 is merely an example. The fingerprint collection apparatus in this embodiment of this application may further include another module or unit, or may further include a module having a function similar to that of each module in FIG. 3, or may not necessarily include all the modules in FIG. 3.

For example, the fingerprint collection apparatus in this embodiment of this application may include only the row scanning circuit 320, the sensor array 310, the switch component 330, and the analog front end component 340 at most. Alternatively, the fingerprint collection apparatus in this embodiment of this application may include only the row scanning circuit 320, the sensor array 310, the switch component 330, the analog front end component 340, and the first control component 350 at most.

Figure 4:
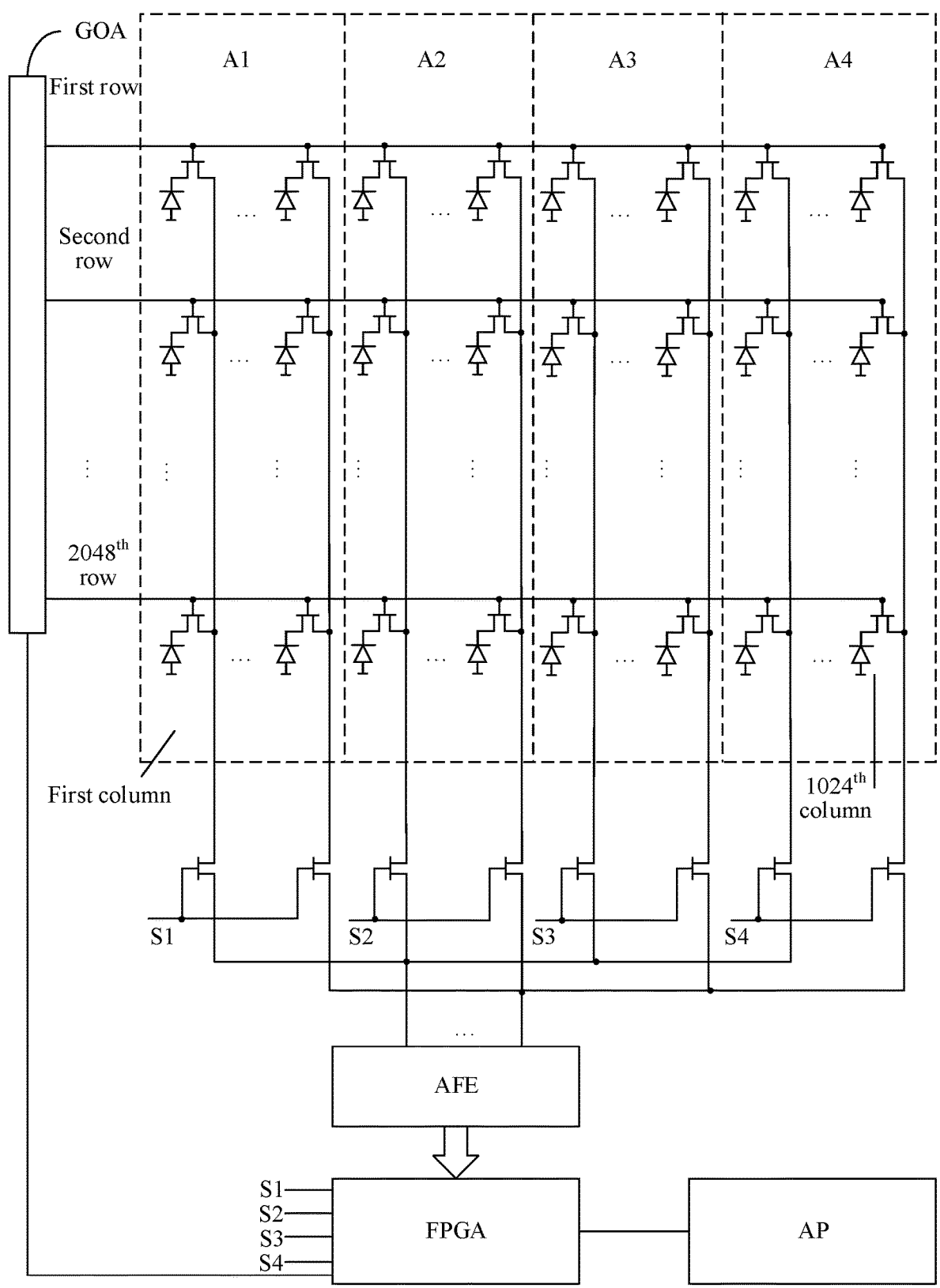
FIG. 4 is a schematic structural diagram of a fingerprint collection apparatus according to another embodiment of this application.

A more specific schematic structural diagram of a fingerprint collection apparatus according to an embodiment of this application is shown in FIG. 4.

As shown in FIG. 4, the fingerprint collection apparatus includes 2048 rows of sensor units and 1024 columns of sensor units, and each sensor unit includes one TFT and one OPD.

The 1024 columns of sensor units may be classified into four areas from left to right, which are respectively A1, A2, A3, and A4. Each area includes 256 columns of sensor units.

A GOA serving as a row scanning circuit includes 2048 output channels. The 2048 output channels are respectively connected to the 2048 rows of sensor units, and each output channel of the GOA is connected to one corresponding row of sensor units.

The GOA is located on a left edge of a sensor array, and is responsible for selecting a row of the sensor array. Each time the GOA inputs a clock signal to enable a next row of sensor units.

A switch component includes 1024 switches, and each switch is one TFT.

The 1024 TFTs included in the switch component are located at the bottom of the sensor array, and the 1024 TFTs are respectively connected to the 1024 columns of sensor units. One TFT is connected to one column of sensor units. In the switch component, TFTs connected to a sensor array in one area may be turned on by using a same enabling signal. For example, switches TFTs connected to the sensor units in the areas A1, A2, A3, and A4 may be respectively turned on by using signals S1, S2, S3, and S4.

For example, an FPGA sends a clock signal to the GOA, and when controlling the GOA to output row scanning signals to the sensor array row by row, the FPGA inputs the signal S1 to switches TFTs corresponding to the area A1. These switches TFTs are turned on, so that sensor units in the area A1 are connected to an AFE. The FPGA further sends a collection time sequence signal to the AFE, to control the AFE to receive original fingerprint data that is output by the sensor array. The AFE converts original fingerprint data generated by the sensor units in the area A1 into digital fingerprint data, and outputs the digital fingerprint data to the FPGA.

The FPGA serving as a first control component converts the digital fingerprint data from a low voltage differential signal (LVDS) interface format to a serial peripheral interface (SPI) format, and outputs the digital fingerprint data to an application processor (AP) serving as a second control component.

It should be understood that a quantity of rows and a quantity of columns of the sensor array, a quantity of switch components TFTs, a quantity of interfaces of the AFE, and the like in FIG. 4 are all examples. For a sensor array including another quantity of rows and another quantity of columns and an AFE including another quantity of input ports, for how to implement multiplexing of the AFE by the sensor units for fingerprint collection, refer to the foregoing content. Details are not described herein again.

In the fingerprint collection apparatuses shown in FIG. 3 and FIG. 4, the sensor array is divided into a plurality of groups in terms of a column based on a quantity of columns of the sensor array and a quantity of input ports of the AFE, and then the row scanning circuit and the switch component may be controlled to select sensor units in a group corresponding to an area in which a finger touches the screen to connect to the AFE, so that a fingerprint signal at any location on the full screen can be collected by using a relatively small quantity of AFEs.

Figure 5:
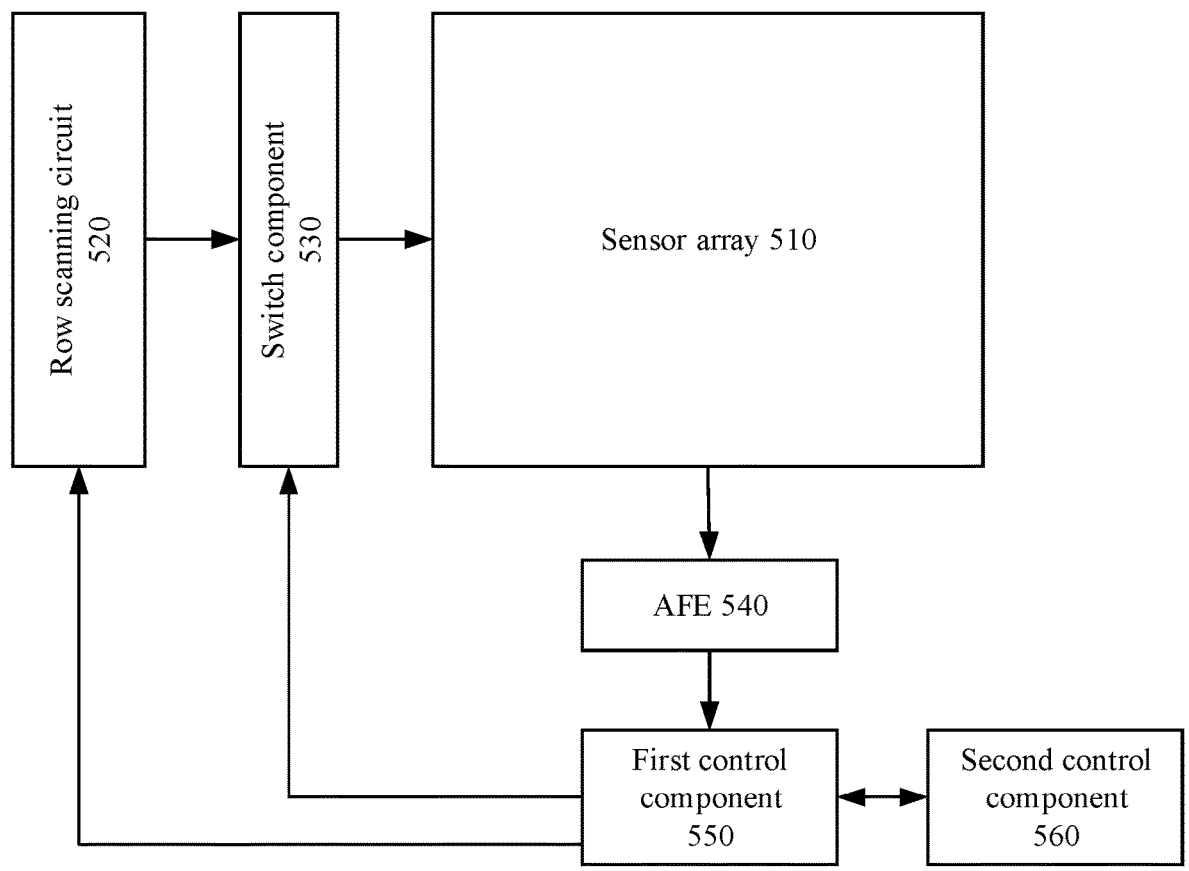
FIG. 5 is a schematic structural diagram of a fingerprint collection apparatus according to another embodiment of this application.

A schematic structural diagram of a fingerprint collection apparatus according to another embodiment of this application is shown in FIG. 5. The fingerprint collection apparatus may include a sensor array 510, a row scanning circuit 520, a switch component 530, an analog front end component 540, a first control component 550, and a second control component 560.

The sensor array 510 may include a TFT substrate and an OPD disposed on the TFT substrate. For example, the TFT substrate includes M rows of TFTs and N columns of TFTs, M rows of OPDs and N columns of OPDs are disposed on the TFT substrate, and the M rows of OPDs and the N columns of OPDs are respectively connected to the M rows of TFTs and the N columns of TFTs. Each TFT is configured to enable an OPD connected to the TFT, and each OPD is configured to convert a sensed optical signal into an electrical signal.

The row scanning circuit 520 and the switch component 530 may be located at an edge location of the TFT substrate. For example, the row scanning circuit 520 and the switch component 530 may be located in a non-display area of the TFT substrate.

The row scanning circuit 520 is equivalent to a shift register, and is responsible for scanning sensors in the sensor array 510 row by row under the control of a clock signal. The switch component 530 is a multi-channel multiplexing component, and may be implemented by a TFT.

The row scanning circuit 520 is connected to the sensor array by using the switch component 530.

The row scanning circuit 520 may cooperate with the switch component 530 to select sensor units in some areas in the sensor array 510 to output original fingerprint data, in other words, to output a fingerprint image signal of a finger on a screen.

For example, when the sensor array 510 is divided into four areas: A1, A2, A3, and A4, the row scanning circuit 520 and the switch component 530 may be configured to select sensor units in one of the four areas to output original fingerprint data.

An input channel of the analog front end component 540 is connected to a data line of the sensor array 510, and data lines of sensor units in different areas in the sensor array are used to multiplex the input channel of the analog front end component 540. An output channel of the analog front end component 540 is connected to the first control component 550. The analog front end component 540 is configured to: convert the received original fingerprint data into digital fingerprint data, and output the digital fingerprint data to the first control component 550.

The first control component 550 is responsible for controlling the row scanning circuit 520 and the switch component 530 to select sensor units in the sensor array, controlling the analog front end component 540 to convert the original fingerprint data, and outputting, to the second control component 560, the digital fingerprint data received from the analog front end component 540. The first control component may be an FPGA, an ASIC, or the like.

The second control component may extract a fingerprint feature of the digital fingerprint data, and store the extracted fingerprint feature or compare the extracted fingerprint feature with a prestored fingerprint feature. If the extracted fingerprint feature matches the prestored fingerprint feature, an operation such as unlocking or payment may be performed.

The first control component may be integrated into the second control component, or a function of the first control component may be implemented by the second control component.

It should be understood that the fingerprint collection apparatus shown in FIG. 5 is merely an example. The fingerprint collection apparatus in this embodiment of this application may further include another module or unit, or may further include a module having a function similar to that of each module in FIG. 5, or may not necessarily include all the modules in FIG. 5.

For example, the fingerprint collection apparatus in this embodiment of this application may include only the row scanning circuit 520, the sensor array 510, the switch component 530, and the analog front end component 540 at most. Alternatively, the fingerprint collection apparatus in this embodiment of this application may include only the row scanning circuit 520, the sensor array 510, the switch component 530, the analog front end component 540, and the first control component 550 at most.

Figure 6:
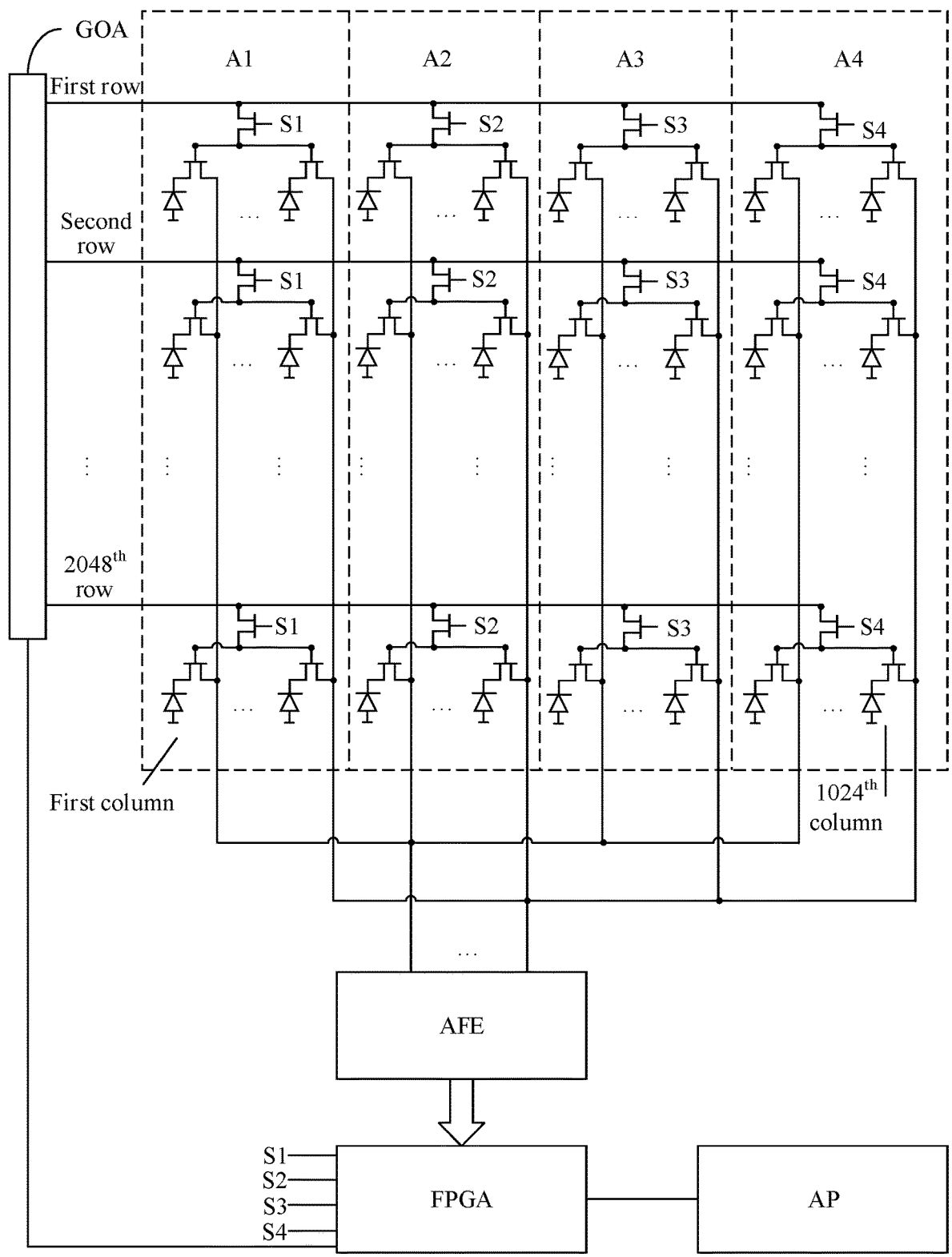
FIG. 6 is a schematic structural diagram of a fingerprint collection apparatus according to another embodiment of this application.

A more specific schematic structural diagram of a fingerprint collection apparatus according to an embodiment of this application is shown in FIG. 6.

As shown in FIG. 6, the fingerprint collection apparatus includes a sensor array including 2048 rows of sensor units and 1024 columns of sensor units, and each sensor unit includes one TFT and one OPD.

Because the sensor array includes the 1024 columns of sensor units, and an AFE includes only the 256 input ports, the 1024 columns of sensor units may be classified into four areas from left to right, which are respectively A1, A2, A3, and A4. Each area includes 256 columns of sensor units.

A switch component includes 2048 rows of switches. The 2048 rows of switches are classified into four groups of switches. The four groups of switches are in a one-to-one correspondence with the four areas, and the 2048 rows of switches are in a one-to-one correspondence with the 2048 rows of sensor units.

A GOA serving as a row scanning circuit includes 2048 output channels. The 2048 output channels are respectively connected to the 2048 rows of switches, and each output channel of the GOA is connected to one corresponding row of switches TFTs.

The GOA is located on a left edge of the sensor array, and is responsible for selecting a row of the sensor array. Each time the GOA inputs a clock signal, the GOA enables a next row of sensor units by using the switch TFT.

The TFTs included in the switch component are located in the sensor array, and are connected to the GOA and the sensor unit. Each row of switches TFTs includes four switches TFTs. The four switches TFTs are respectively connected to the sensor units in the four areas.

Switches TFTs connected to a sensor array in one area may be turned on by using a same signal. For example, switches TFTs connected to the sensor units in the areas A1, A2, A3, and A4 may be respectively turned on by using signals S1, S2, S3, and S4.

For example, an FPGA sends a clock signal to the GOA, and when controlling the GOA to output row scanning signals row by row, the FPGA inputs the signal S1 to switches TFTs corresponding to the area A1. These switches TFTs are turned on, so that the sensor units in the area A1 are connected to the GOA, and the sensor units in the area A1 receive the row scanning signals. The FPGA further sends a collection time sequence signal to an AFE, to control the AFE to receive the original fingerprint data that is output by the sensor array. The AFE converts original fingerprint data generated by the sensor units in the area A1 into digital fingerprint data, and outputs the digital fingerprint data to the FPGA.

The FPGA serving as a first control component converts the digital fingerprint data from an LVDS interface format to an SPI format, and outputs the digital fingerprint data to an AP serving as a second control component.

It should be understood that a quantity of rows and a quantity of columns of the sensor array, a quantity of switches TFTs, a quantity of interfaces of the AFE, and the like in FIG. 6 are all examples. For a sensor array including another quantity of rows and another quantity of columns and an AFE including another quantity of input ports, for how to implement multiplexing of the AFE by the sensor units for fingerprint collection, refer to the foregoing content. Details are not described herein again.

Figure 7:
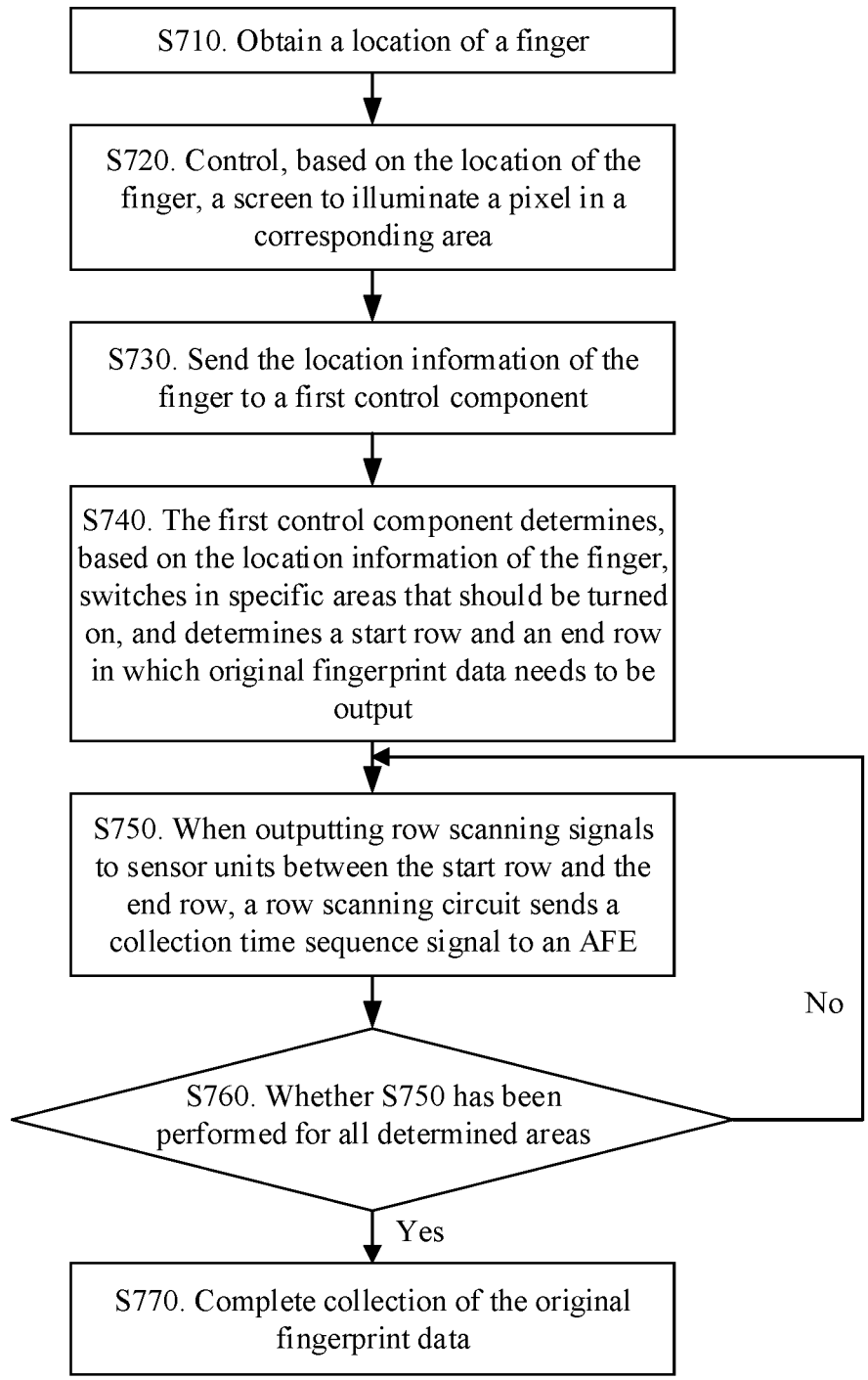
FIG. 7 is a schematic flowchart of a fingerprint recognition method according to another embodiment of this application.

A schematic flowchart of a fingerprint collection method according to an embodiment of this application is shown in FIG. 7. It should be understood that FIG. 7 shows steps or operations of the fingerprint collection method, but these steps or operations are merely examples. In this embodiment of this application, other operations or variations of the operations in FIG. 7 may be further performed. In addition, the steps in FIG. 7 may be performed in a sequence different from a sequence presented in FIG. 7, and it is possible that all operations in FIG. 7 do not necessarily need to be performed.

The fingerprint collection method shown in FIG. 7 may be performed by the fingerprint collection apparatus shown in any one of FIG. 3 to FIG. 6.

S710. A second control component obtains information about a location at which a finger touches a screen. For this step, refer to the prior art. Details are not described herein.

S720. The second control component controls, based on the information about the location at which the finger touches the screen, the screen to illuminate an area corresponding to the location at which the finger touches the screen.

In this case, light emitted by these illuminated screen pixels is irradiated to the finger. A fingerprint of the finger reflects the light. The light reflected by the fingerprint of the finger may pass through a gap between the screen pixels, and then is irradiated to a sensor array. A sensor unit in the sensor array generates and stores an analog electrical signal based on the light reflected by the fingerprint, and the electrical signal is original fingerprint data.

S730. The second control component sends the location information of the finger to the first control component in an fingerprint collection apparatus.

S740. The first control component determines, based on the location information of the finger, a specific area, in the sensor array, that includes a sensor unit generating original fingerprint data that should be output, to determine a specific group whose switches should be turned on and a specific group whose switches should be turned off. In addition, the first control component further determines a start row and an end row in the sensor array based on the location information of the finger.

One of the plurality of groups of switches that should be turned on may become a target group of switches.

S750. The first control component sends a clock signal to a row scanning circuit, so that the row scanning circuit outputs row scanning signals to the sensor array row by row.

The first control component sends enabling signals to all switches. An enabling signal sent to the target group of switches is an enabling signal for turning on the switches, and enabling signals sent to the other groups of switches are enabling signals for turning off the switches. The first control component may send a same enabling signal to a same group of switches.

In addition, when the row scanning circuit outputs the row scanning signal to the start row, the first control component starts to send a collection time sequence signal to an AFE, so that the AFE starts to receive the original fingerprint data generated by the sensor unit. The first control component stops outputting the collection time sequence signal to the AFE until the row scanning circuit outputs the row scanning signal to the end row, so that the AFE stops receiving the original fingerprint data generated by the sensor array.

After receiving the original fingerprint data, the AFE converts the original fingerprint data into digital fingerprint data, and sends the digital fingerprint data to the first control component.

The first control component converts the digital fingerprint data from an LVDS receiving format to an SPI interface format, and sends the digital fingerprint data to the second control component.

S760. The first control component determines whether S750 has been performed for all areas corresponding to fingers. If S750 has been performed for all the areas corresponding to the fingers, S770 is performed. If S750 has not been performed for all the areas corresponding to the fingers, S750 is performed for a next area for which S750 is not performed.

S770. Complete collection of the original fingerprint data.

The application processor in the embodiments of this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A fingerprint collection apparatus, comprising:
a sensor array comprising a thin film transistor (TFT) substrate and organic photosensitive diodes (OPDs), disposed on the TFT substrate, the TFT substrate includes M rows of TFTs and N columns of TFTs, wherein M rows of OPDs and N columns of OPDs are disposed on the TFT substrate, and the M rows of OPDs and the N columns of OPDs are respectively connected to the M rows of TFTs and the N columns of TFTs, each TFT is configured to enable an OPD connected to the TFT, and each OPD is configured to convert a sensed optical signal into an electrical signal; wherein a switch circuit is implemented by TFTs; M rows of sensor units and N columns of sensor units are comprised in the sensor array; each sensor unit includes one TFT and one OPD, the one TFT comprised in said each sensor unit is configured to: when a row scanning signal is received, output original fingerprint data generated by the one OPD;
an analog front end circuit comprising L input channels, M and N are positive integers greater than 1, and L is a positive integer less than N, wherein the N columns of sensor units are grouped into a plurality of groups of sensor units based on column as a unit, and a quantity of columns of sensor units comprised in each of the plurality of groups of sensor units is less than or equal to L;
the switch circuit to multiplex the L input channels of the analog front end circuit in a time division manner using data lines of the plurality of groups of sensor units;
a row scanning circuit configured to output row scanning signals of the sensor array row by row, wherein
each sensor unit in the sensor array is configured to: generate original fingerprint data, and output the original fingerprint data from a data line when a row scanning signal is received;
the switch circuit is configured to select to output the original fingerprint data in any one of the plurality of groups of sensor units to the L input channels; and
the analog front end circuit is configured to convert, into digital fingerprint data, the original fingerprint data that is output by the any group of sensor units.

2. The fingerprint collection apparatus according to claim 1, wherein the switch circuit comprises a plurality of groups of switches, the plurality of groups of switches are in a one-to-one correspondence with the plurality of groups of sensor units, each group of switches comprises L switches, and each of the plurality of groups of sensor units comprises L columns of sensor units;
data lines of the L columns of sensor units comprised in each of the plurality of groups of sensor units are respectively connected to the L input channels of the analog front end circuit by using L switches comprised in a corresponding group of switches in the plurality of groups of switches;
the fingerprint collection apparatus further comprises a first control circuit configured to send a clock signal to the row scanning circuit;
the row scanning circuit is configured to output the row scanning signals of the sensor array row by row based on the clock signal;

the first control circuit is further configured to send enabling signals to the plurality of groups of switches, and the enabling signal are used to turn on a target group of switches in the plurality of groups of switches and turn off the other groups of switches in the plurality of groups of switches; and the switch circuit is configured to select to output the original fingerprint data in a target group of sensor units corresponding to the target group of switches to the L input channels.

3. The fingerprint collection apparatus according to claim 2, wherein the first control circuit is further configured to output a collection time sequence signal to the analog front end circuit when outputting the clock signal and the enabling signal, and the collection time sequence signal is used to control the analog front end circuit to receive the original fingerprint data that is output by the sensor array.

4. The fingerprint collection apparatus according to claim 3, wherein the fingerprint collection apparatus further comprises a screen and a second control circuit;

the second control circuit is configured to: determine location information of a finger on the screen, and send the location information to the first control circuit; and the first control circuit is configured to: determine a start row and an end row of the M rows of sensor units based on the location information, determine the target group of sensor units from the plurality of groups of sensor units based on the location information, output the collection time sequence signal to the analog front end circuit when the row scanning circuit outputs the row scanning signal to the start row, and stop outputting the collection time sequence signal to the analog front end circuit until the row scanning circuit outputs the row scanning signal to the end row, wherein the target group of switches correspond to the target group of sensor units, sensor units between the start row and the end row comprise a sensor unit that is in the sensor array and that is located in an area corresponding to the location information, and the target group of sensor units comprises the sensor unit.

5. The fingerprint collection apparatus according to claim 4, wherein the second control circuit is further configured to send the location information to the screen; and the screen is configured to illuminate, based on the location information, a pixel that is on the screen and that is located in the area corresponding to the location information.

6. The fingerprint collection apparatus according to claim 4, wherein the area corresponding to the location information comprises an area, of a size of 10 millimeters×10 millimeters, that is centered on a location indicated by the location information.

7. A display, comprising:
a display circuit; and
a fingerprint collection apparatus; wherein the fingerprint collection apparatus comprises
a sensor array comprising a thin film transistor (TFT) substrate and organic photosensitive diodes (OPDs), disposed on the TFT substrate, the TFT substrate includes M rows of TFTs and N columns of TFTs, wherein M rows of OPDs and N columns of OPDs are disposed on the TFT substrate, and the M rows of OPDs and the N columns of OPDs are respectively connected to the M rows of TFTs and the N columns of TFTs, each TFT is configured to enable an OPD connected to the TFT, and each OPD is configured to convert a sensed optical signal into an electrical signal; wherein a switch circuit is implemented by TFTs; M rows of sensor units and N columns of sensor units are comprised in the sensor array; each sensor unit includes one TFT and one OPD, the one TFT comprised in said each sensor unit is configured to: when a row scanning signal is received, output original fingerprint data generated by the one OPD;

an analog front end circuit comprises L input channels, M and N are positive integers greater than 1, and L is a positive integer less than N, wherein the N columns of sensor units are grouped into a plurality of groups of sensor units based on column as a unit, and a quantity of columns of sensor units comprised in each of the plurality of groups of sensor units is less than or equal to L;

the switch circuit to multiplex the L input channels of the analog front end circuit in a time division manner using data lines of the plurality of groups of sensor units;

a row scanning circuit configured to output row scanning signals of the sensor array row by row; wherein the sensor unit in the sensor array is configured to: generate original fingerprint data, and output the original fingerprint data from a data line when a row scanning signal is received;

the switch circuit is configured to select to output the original fingerprint data in any one of the plurality of groups of sensor units to the L input channels; and the analog front end circuit is configured to convert, into digital fingerprint data, the original fingerprint data that is output by the any group of sensor units.

8. The display according to claim 7, wherein the switch circuit comprises a plurality of groups of switches, the plurality of groups of switches are in a one-to-one correspondence with the plurality of groups of sensor units, each group of switches comprises L switches, and each of the plurality of groups of sensor units comprises L columns of sensor units;

data lines of the L columns of sensor units comprised in each of the plurality of groups of sensor units are respectively connected to the L input channels of the analog front end circuit by using L switches comprised in a corresponding group of switches in the plurality of groups of switches;

the fingerprint collection apparatus further comprises a first control circuit, and the first control circuit is configured to send a clock signal to the row scanning circuit;

the row scanning circuit is configured to output the row scanning signals of the sensor array row by row based on the clock signal;

the first control circuit is further configured to send enabling signals to the plurality of groups of switches, and the enabling signal are used to turn on a target group of switches in the plurality of groups of switches and turn off the other groups of switches in the plurality of groups of switches; and the switch circuit is configured to select to output the original fingerprint data in a target group of sensor units corresponding to the target group of switches to the L input channels.

9. The display according to claim 8, wherein the first control circuit is further configured to output a collection time sequence signal to the analog front end circuit when outputting the clock signal and the enabling signal, and the collection time sequence signal is used to control the analog front end circuit to receive the original fingerprint data that is output by the sensor array.

10. The display according to claim 9, wherein the fingerprint collection apparatus further comprises a screen and a second control circuit;

the second control circuit is configured to: determine location information of a finger on the screen, and send the location information to the first control circuit; and the first control circuit is configured to: determine a start row and an end row of the M rows of sensor units based on the location information, determine the target group of sensor units from the plurality of groups of sensor units based on the location information, output the collection time sequence signal to the analog front end circuit when the row scanning circuit outputs the row scanning signal to the start row, and stop outputting the collection time sequence signal to the analog front end circuit until the row scanning circuit outputs the row scanning signal to the end row, wherein the target group of switches correspond to the target group of sensor units, sensor units between the start row and the end row comprise a sensor unit that is in the sensor array and that is located in an area corresponding to the location information, and the target group of sensor units comprises the sensor unit.

11. The display according to claim 10, wherein the second control circuit is further configured to send the location information to the screen; and the screen is configured to illuminate, based on the location information, a pixel that is on the screen and that is located in the area corresponding to the location information.

12. The display according to claim 7, wherein each sensor unit in the sensor array comprises a thin film transistor and an organic photosensitive diode, the organic photosensitive diode is configured to generate the original fingerprint data, and the thin film transistor comprised in the sensor unit is configured to: when the row scanning signal is received, output the original fingerprint data generated by the organic photosensitive diode.

13. A terminal, comprising:
a processor;
a memory; and
a fingerprint collection apparatus, wherein, the fingerprint collection apparatus comprises
a sensor array comprising a thin film transistor (TFT) substrate and organic photosensitive diodes (OPDs), disposed on the TFT substrate, the TFT substrate includes M rows of TFTs and N columns of TFTs, wherein M rows of OPDs and N columns of OPDs are disposed on the TFT substrate, and the M rows of OPDs and the N columns of OPDs are respectively connected to the M rows of TFTs and the N columns of TFTs, each TFT is configured to enable an OPD connected to the TFT, and each OPD is configured to convert a sensed optical signal into an electrical signal; wherein a switch circuit is implemented by TFTs; M rows of sensor units and N columns of sensor units are comprised in the sensor array; each sensor unit includes one TFT and one OPD, the one TFT comprised in said each sensor unit is configured to: when a row scanning signal is received, output original fingerprint data generated by the one OPD;
an analog front end circuit comprising L input channels, M and N are positive integers greater than 1, and L is a positive integer less than N, wherein the N columns of sensor units are grouped into a plurality of groups of sensor units based on column as a unit, and a quantity of columns of sensor units comprised in each of the plurality of groups of sensor units is less than or equal to L;
the switch circuit to multiplex the L input channels of the analog front end circuit in a time division manner using data lines of the plurality of groups of sensor units;
a row scanning circuit is configured to output row scanning signals of the sensor array row by row; wherein
the sensor unit in the sensor array is configured to: generate original fingerprint data, and output the original fingerprint data from a data line when a row scanning signal is received;
the switch circuit is configured to select to output the original fingerprint data in any one of the plurality of groups of sensor units to the L input channels; and
the analog front end circuit is configured to convert, into digital fingerprint data, the original fingerprint data that is output by the any group of sensor units.

14. The terminal according to claim 13, wherein the switch circuit comprises a plurality of groups of switches, the plurality of groups of switches are in a one-to-one correspondence with the plurality of groups of sensor units, each group of switches comprises L switches, and each of the plurality of groups of sensor units comprises L columns of sensor units;

data lines of the L columns of sensor units comprised in each of the plurality of groups of sensor units are respectively connected to the L input channels of the analog front end circuit by using L switches comprised in a corresponding group of switches in the plurality of groups of switches;

the fingerprint collection apparatus further comprises a first control circuit, and the first control circuit is configured to send a clock signal to the row scanning circuit;

the row scanning circuit is configured to output the row scanning signals of the sensor array row by row based on the clock signal;

the first control circuit is further configured to send enabling signals to the plurality of groups of switches, and the enabling signal are used to turn on a target group of switches in the plurality of groups of switches and turn off the other groups of switches in the plurality of groups of switches; and the switch circuit is configured to select to output the original fingerprint data in a target group of sensor units corresponding to the target group of switches to the L input channels.

15. The terminal according to claim 14, wherein the first control circuit is further configured to output a collection time sequence signal to the analog front end circuit when outputting the clock signal and the enabling signal, and the collection time sequence signal is used to control the analog front end circuit to receive the original fingerprint data that is output by the sensor array.

16. The terminal according to claim 15, wherein the fingerprint collection apparatus further comprises a screen and a second control circuit;

the second control circuit is configured to: determine location information of a finger on the screen, and send the location information to the first control circuit; and the first control circuit is specifically configured to: determine a start row and an end row of the M rows of sensor units based on the location information, determine the target group of sensor units from the plurality of groups of sensor units based on the location information, output the collection time sequence signal to the analog front end circuit when the row scanning circuit outputs the row scanning signal to the start row, and stop outputting the collection time sequence signal to the analog front end circuit until the row scanning circuit outputs the row scanning signal to the end row, wherein the target group of switches correspond to the target group of sensor units, sensor units between the start row and the end row comprise a sensor unit that is in the sensor array and that is located in an area corresponding to the location information, and the target group of sensor units comprises the sensor unit.

17. The terminal according to claim 16, wherein the second control circuit is further configured to send the location information to the screen; and the screen is configured to illuminate, based on the location information, a pixel that is on the screen and that is located in the area corresponding to the location information.

18. The terminal according to claim 13, wherein each sensor unit in the sensor array comprises a thin film transistor and an organic photosensitive diode, the organic photosensitive diode is configured to generate the original fingerprint data, and the thin film transistor comprised in the sensor unit is configured to: when the row scanning signal is received, output the original fingerprint data generated by the organic photosensitive diode.

\* \* \* \* \*